US012721333B2

(12) United States Patent
Einecke et al.

(10) Patent No.: US 12,721,333 B2
(45) Date of Patent: Sep. 1, 2026

(54) WEED CONTROL SYSTEM

(71) Applicant: Honda Motor Co., Ltd., Tokyo (JP)

(72) Inventors: Nils Einecke, Offenbach (DE); Mathias Franzius, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 343 days.

(21) Appl. No.: 18/515,198

(22) Filed: Nov. 20, 2023

(65) Prior Publication Data

US 2024/0206456 A1 Jun. 27, 2024

(30) Foreign Application Priority Data

Dec. 23, 2022 (EP) .................................... 22216381

(51) Int. Cl.

| | |
|---|---|
| ***A01M 21/02*** | (2006.01) |
| ***A01D 43/14*** | (2006.01) |
| *A01D 101/00* | (2006.01) |

(52) U.S. Cl.

CPC ............. *A01M 21/02* (2013.01); *A01D 43/14* (2013.01); *A01D 2101/00* (2013.01)

(58) Field of Classification Search

CPC .... A01M 21/02; A01D 43/14; A01D 2101/00
USPC ........................................................... 56/16.7
See application file for complete search history.

(56) References Cited

U.S. PATENT DOCUMENTS

| | | | | |
|---|---|---|---|---|
| 2014/0121881 | A1 | 5/2014 | Diazdelcastillo | |
| 2017/0238460 | A1* | 8/2017 | MacKean | A01D 34/008 |
| 2018/0232578 | A1* | 8/2018 | Pattnaik | G01N 33/24 |
| 2019/0216018 | A1* | 7/2019 | Bassett | A01D 43/14 |
| 2019/0239502 | A1 | 8/2019 | Palomares et al. | |
| 2021/0235607 | A1* | 8/2021 | Lee | A01B 1/16 |
| 2021/0251132 | A1* | 8/2021 | Oh | B60B 19/12 |
| 2024/0365693 | A1* | 11/2024 | Rath, Jr. | A01B 39/085 |

(Continued)

FOREIGN PATENT DOCUMENTS

| | | |
|---|---|---|
| CN | 112425344 | 3/2021 |
| EP | 3081068 | 10/2016 |
| EP | 3187953 | 7/2017 |

(Continued)

OTHER PUBLICATIONS

"Search Report of Europe Counterpart Application", issued on Jun. 12, 2023, p. 1-p. 8.

(Continued)

*Primary Examiner* — Mahmoud S Ismail
(74) *Attorney, Agent, or Firm* — JCIPRNET

(57) ABSTRACT

A weed control system includes an autonomous work device, and the autonomous work device includes driving means configured to move the autonomous work device, sensor means configured acquire a sensor signal from the environment of the autonomous device, and a control circuit configured to control the driving means to navigate the autonomous work device in the environment. The weed control system includes at least one disposable releasable shading plate arranged on a release mechanism of the autonomous work device. The control circuit is configured to detect plants in the environment based on the acquired sensor signal, to determine whether a detected plant is a target plant, and in case a detected plant is a target plant, to control the release mechanism to release the releasable shading plate onto the location of the detected target plant.

21 Claims, 6 Drawing Sheets

(56) References Cited

U.S. PATENT DOCUMENTS

2024/0373782 A1* 11/2024 Roos .................... A01D 34/008

FOREIGN PATENT DOCUMENTS

| | | |
|---|---|---|
| EP | 3262934 | 1/2018 |
| EP | 3381257 | 10/2018 |
| KR | 101799977 | 11/2017 |

OTHER PUBLICATIONS

A S M Mahmudul Hasan et al., "A survey of deep learning techniques for weed detection from images", Computers and Electronics in Agriculture, May 2021, pp. 1-52.

* cited by examiner

S1, ... , S8

$$(1)\quad \frac{z}{h} = \frac{y}{f}\,; \qquad \Rightarrow \qquad (2)\quad z = \frac{y}{f} h\,;$$

WEED CONTROL SYSTEM

CROSS-REFERENCE TO RELATED APPLICATION

This application claims the priority benefit of European Patent Application No. 22 216 381.8, filed on Dec. 23, 2022. The entirety of the above-mentioned patent application is hereby incorporated by reference herein and made a part of this specification.

BACKGROUND

Technical Field

The invention concerns the field of autonomous gardening devices, in particular autonomous lawn-mowing devices. The invention also concerns the field of weed control or weed suppression in gardening and agriculture.

Related Art

The market for autonomous work devices is expanding each year. One economically significant example for autonomous work devices are autonomous lawn-mowing devices (autonomous lawnmowers, lawn-mowing robots), which are self-propelled, autonomously controlled and can perform the task of mowing the lawn in a working area without direct interaction by the user once the initial configuration of the autonomous lawn-mowing device has been set up. Deploying the autonomous lawn-mowing device increases the comfort for the user owning a garden significantly by reducing the time the user has to attend to the garden personally. Nevertheless, the basic concept of operation of an autonomous lawnmower has not changed for many years. Essentially, the autonomous lawnmower moves randomly in an environment including the working area, which originally had been defined by an electric boundary wire. Recent examples of the autonomous lawn-mowing device may navigate in the environment using a camera and image processing of images acquired for navigation purposes. The autonomous lawnmower is self-propelled, which means it has the capability to move across the working area being driven by own driving means, such as an electric motor that drives wheels of the lawnmower, and without the user (gardener) needing to push the working machine. Nevertheless, it is still necessary, that the gardener controls the working machine regularly and controls its working performance, e.g., the quality of the mowed lawn. In particular, the autonomous lawn-mower fails in providing a capability to tackle the problem of unwanted weeds growing in the grass area of the lawn, and therefore adversely affecting a perceived quality of the lawn in the eyes of most gardeners.

Thus, the gardener is still required to detect visually unwanted weed plants in the grass, and to tackle the detected weed plants manually. There exist proposals for tackling unwanted weed plants in agriculture, which is based on applying chemicals (herbicides) or using extensive mechanical force for weeding that involve drilling or hoeing techniques. However, applying chemicals in the garden area is undesired or even strictly rejected by a growing number of gardeners. The existing approaches for mechanically tackling unwanted weed plants require complex tools and a large amount of energy, which currently prevents their application in the contested volume market for autonomous gardening tools for private individuals and restrict these approaches to commercial uses.

In order to detect unwanted weeds, an autonomous device may use cameras and three-dimensional (3D-) sensors in order to detect and locate weeds. Currently, approaches exist to detect weed and to generate a digital map of an environment that includes the locations of the detected weeds.

EP 3 262 934 A1 uses such digital map to apply herbicides selectively at the locations of the detected unwanted weeds. Alternatively, removing the weeds may be performed using cutting blades or some kind of tine arrangement as the patent KR 101 799 977 B1 discloses in the specific field of robotic devices for fruit farms. EP 3 081 068 A1 discloses an autonomous lawn mower with a camera which is configured in a modular fashion. EP 3 187 953 A1 describes to generate a localization and mapping with a camera and additional boundary wire signal strength information. Generation of a mapping of a mowing area using an autonomous lawn mower by driving the mower along the boundary wire is described for example in EP 3 381 257 A1.

Nevertheless, there remains the objective of improving existing solutions of suppressing weed in a lawn area in the garden environment.

SUMMARY

The weed control system including an autonomous work device according to the independent claim provides an advantageous solution.

The dependent claims define further advantageous embodiments of the weed control system.

The weed control system comprises an autonomous work device, wherein the autonomous work device comprises a driving means configured to move the autonomous work device. A control circuit of the autonomous work device is configured to control the driving means to navigate the autonomous work device in the environment. The weed control system comprises at least one releasable shading plate arranged on a release mechanism of the autonomous work device. The control circuit is configured to obtain information on locations of target plant (unwanted weed), and to control the release mechanism to release the releasable shading plate onto a location of the detected target plant.

Preferably, the system comprises a sensor means configured to sense the environment and to generate a sensor signal based on the sensed environment of the autonomous work device. The processing means may then detect one or more plants in the environment based on the acquired sensor signal and determine whether a detected plant is a target plant. In case that the detected plant is a target plant, the control circuit controls the device to drive to the location of the target plant and to release a shading plate. Alternatively, or in addition, information on one or more locations of target plants may be provided by external device, so that the control circuit obtains information on such locations from the external device. Based on such information obtained by the control circuit, the working device is then able to move to the location of the identified target plant and to release a shading plate.

The weed control system integrates into an autonomous work device a capability to tackle unwanted weed plants in a garden area. The autonomous work device is either a dedicated device for weed control or provides further gardening functions like an autonomous lawnmower device. In case of integration into a device providing further functionality, there is no need for separate weed control device in addition to other autonomous work devices which may be used by the gardener anyway.

Being integrated in an autonomous work device already providing another function like mowing lawn, the weed control system may use an existing sensor, e.g., a camera sensor of the lawn mower as autonomous work device to detect and locate unwanted weed, and to deploy the releasable shading plate precisely at the determined location of the unwanted weed.

The weed control system may then use the existing sensor, e.g., the camera sensor, and the moving means already included in the autonomous work device to deploy the releasable shading plate at the determined location of the unwanted weed by navigating the autonomous work device to the location of the targeted weed and then deploy the releasable shading plate.

Thus, the structural means added to the autonomous work device providing another gardening function already are only small and of a low complexity: there exist mechanically simple possibilities for implementing the release mechanism for releasing the releasable shading plate automatically at the current position of the autonomous work device. The proposed weed control system uses the camera sensor, the moving means of the autonomous work device providing another gardening function and the control circuit, which the known autonomous work device already comprises. The weed control system adds the further functionalities having some complexity only in form of software, e.g., software modules, in the control circuit. The software performs tasks such as detecting the unwanted weed involving image processing, extracting image features characteristic for discriminating between desired plants and unwanted weed for a subsequent classification, and of navigating the autonomous device to the location of the unwanted weed in the working area.

It is to be noted that in case the autonomous work device is a dedicated weed control device, the above explained units which may be commonly used in a combined function autonomous work device need to be provided in the autonomous work device being an exclusive weed control device. The following explanations use the combined autonomous work device, which as an example, might be an autonomous lawn mower.

The weed control system proposes an alternative to applying herbicides or complex and mechanical arrangements requiring energy for operation, by using the releasable shading plate for blocking the sunlight to the unwanted weed. Blocking the sunlight deprives the unwanted weed plant of its ability for photosynthesis, so that the plant will wither and die. The soil or the environment is not burdened with chemical residues of herbicides. The negative impact of herbicides on, e.g., insects in the garden is avoided.

The limited energy resources available on a battery-driven autonomous work device are used economically by operating the mechanically simple release mechanism (plate disposal means) instead of operating a mechanism involving cutting blades or some kind of tine arrangement in order to physically destroy the weed and its roots in the upper layer of the soil.

The weed control system according to an embodiment has the sensor means comprising a camera, and the control circuit is configured detect the plants by performing image processing of the sensor signal, in particular to detect the plants and determine the target plant using a classification algorithm or using a deep neural network.

There exist already approaches for classifying weed in an agricultural context. The function of the camera sensor of the autonomous work device is, compared to other autonomous gardening devices, extended for implementing the weed suppression function without requiring a new additional sensor. The image processing may be performed onboard the autonomous work device based on its own data processing circuitry, e.g., the control circuit, or using a cloud computing facility running on a central server and accessed using the control circuit and a communication means of the autonomous work device often already integrated.

According to an embodiment of the weed control system, the control circuit is configured to perform a mapping function, and to record at least one of the locations of the target plant and a location of the releasable shading plate in a map.

The mapping function may already exist for navigating the autonomous work device in the work area, e.g., in form of a simultaneous localization and mapping (SLAM) capability. Recording weed locations and locations of released (deposited) shading plates in the map enables extended functionalities of the weed control system: guiding the gardener to detected weed or to recollect manually deposited shading plates, recollecting automatically deposited shading plates by the autonomous work device and thereby further reducing the burden on the gardener, are only some examples.

The weed control system according to an embodiment has the release mechanism comprising at least one electromagnet, and the releasable shading plate includes a metallic element. The control circuit is configured to control releasing the releasable shading plate by controlling the at least one electromagnet.

Using electromagnets for the release mechanism is an easily controllable, reliable and cost-effective mechanism using the electric power already available on the autonomous work device.

According to an embodiment of the weed control system, the releasable shading plate is made of metallic material, and covered with a corrosion-protective coating.

Thus, the releasable shading plate is usable with an electromagnetic release mechanism, resistant against environmental impacts, easily producible by a coating process, and therefore stable and cost effective at the same time.

The releasable shading plate is made of decomposable material in the weed control system according to an embodiment.

The decomposable shading plate does not require recollecting, in particular in case the time for disintegrating essentially corresponds the time the weed requires for withering under the deposited shading plate. According to an even more preferred embodiment, the decomposable shading plate may contain grass seeds and/or fertilizer. Such a shading plate has the advantage that grass in the area where the target plant died off will quickly grow and thereby inhibit growth of a new undesired plant.

According to an embodiment of the weed control system, the releasable shading plate comprises at least one ground spike, and the control circuit is configured to control the moving means to move the autonomous device onto the releasable shading plate.

The ground spike ensures that the releasable shading plate remains at the location of release independent from environmental forces, e.g., rain, hail, roaming animals. Moving the autonomous work device onto the releasable shading plate for driving the ground spike into the soil only requires implementing a specific movement pattern of the autonomous device after release of the releasable shading plate on a known location. Using the own weight of the autonomous work device exerting force via at least one wheel of the moving means towards the ground for driving the ground spike into the ground reduces the mechanical complexity and therefore cost of the release mechanism further.

In the weed control system according to an embodiment the release mechanism comprises at least one suction cap, and the control circuit is configured to control releasing the releasable shading plate by controlling the at least one suction cap.

Designing the release mechanism using suction force works with shading plates of different materials, in particular with non-magnetic shading plates, e.g., decomposable shading plates.

In the weed control system according to an embodiment, the releasable shading plate comprises at least one of a RFID tag, a QR code and a color-coding recording an identity code of the releasable shading plate.

Providing the releasable shading plate with a readable identity code enables to track any deposited shading plate over time, to simplify recollection of the correct shading plate after a predetermined time has elapsed, or to communicate to the user, which shading plate when to recollect, in a particular when the identity code is readable for humans.

According to an embodiment of the weed control system, the system is configured to release the releasable shading plate at a predefined storage location.

Thus, the autonomous work device may use the storage location for managing use of number of shading plates, which exceeds the capacity of shading plates held by the release means on board of the autonomous work device itself. The autonomous work device may deposit not required shading plates at the storage location, and reequip with shading plates at the storage location after depositing on a weed location the at least one shading plate readily available for release by the release mechanism on board of the autonomous work device.

In the weed control system according to an embodiment, the predefined storage location is a charging station of the autonomous device.

Thus, reequipping with further shading plates and reloading an energy storage, e.g., a rechargeable battery of the autonomous work device, may be performed simultaneously, at a same location in or near the working environment, which simplifies operation of the autonomous work device.

According to an embodiment of the weed control system, the system is configured to recollect the releasable shading plate after a predetermined time since releasing the releasable shading plate has elapsed.

Thus, not only deployment of the releasable shading plate is performed fully autonomously, but also recollecting the releasable shading plate does not require action and time of the user of the autonomous weed control system.

The weed control system according to an embodiment comprises a user interface configured to inform a user when to recollect the releasable shading plate.

Thus, the user is not only informed for recollecting the releasable shading plate at the required time, but may simultaneously inspect the success of the weed suppression visually on spot and in time when the success should be visible. This feature also results in a guided quality inspection of the weed suppression performance by the weed control system.

According to an embodiment of the weed control system according to any of the preceding claims, wherein the weed control system comprises a sowing means. The control circuit is configured to control the sowing means to sow seeds, in particular grass seeds, at the location of the detected target plant after recollecting the releasable shading plate or after the releasable shading plate has decomposed.

Thus, the weed control system extends from an exclusive weed control system to a lawn maintenance system, which compensates for the disadvantageous withering of desired grass plants withering under the deposited shading plate as well as the undesired weed.

The weed control system according to an embodiment has an autonomous lawnmower as the work device.

Autonomous lawnmowers are widespread autonomous work devices in use, which may benefit significantly from the additional functionality of weed suppression provided by the weed control system, and thus represent an economically most interesting market.

BRIEF DESCRIPTION OF THE DRAWINGS

The description of embodiments of the weed control system refers to the attached figures.

DETAILED DESCRIPTION

In the figures, same reference signs denote same or corresponding elements. The description of the figures dispenses with a discussion of same reference signs in different figures wherever deemed possible without adversely affecting comprehensibility.

Figure 1:
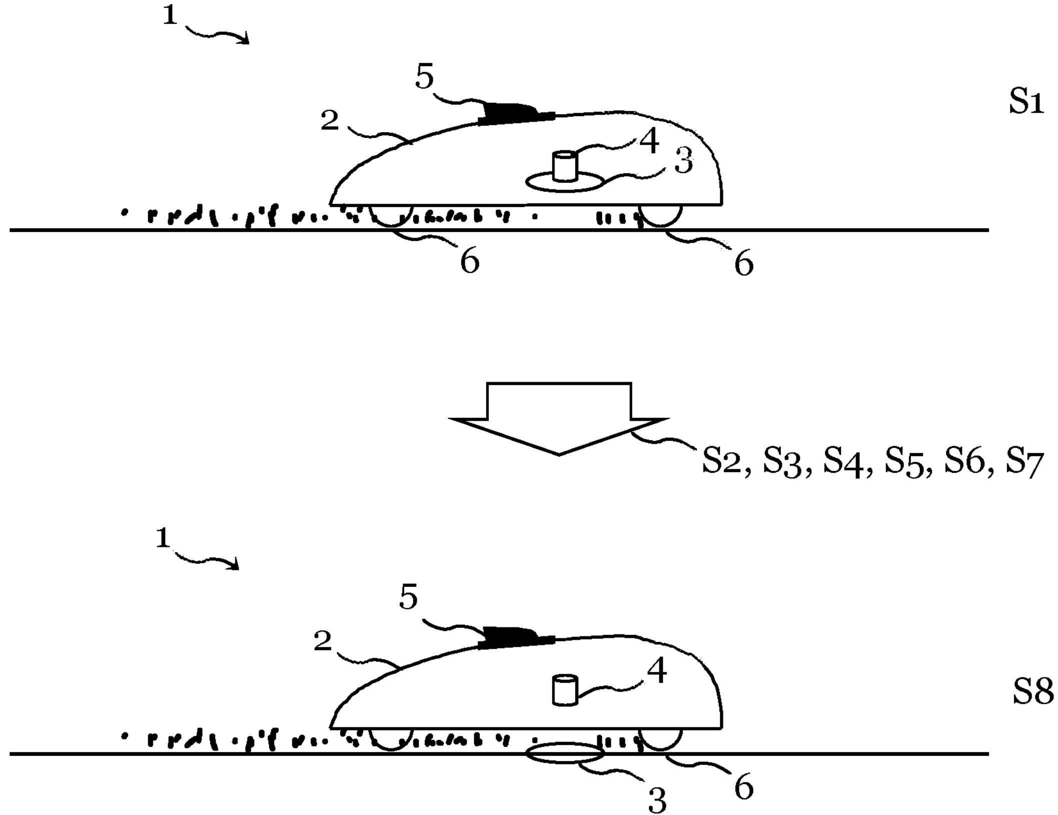
FIG. 1 illustrates a process of the autonomous work device releasing a shading plate according to an embodiment of the autonomous weed control system.

FIG. 1 illustrates a process of the autonomous work device 2 releasing (depositing) a shading plate 3 according to an embodiment of the autonomous weed control system 1.

The autonomous work device 2 is an autonomous lawnmower, which operates in a working area. The autonomous lawnmower is a well-established robotic device designed for mowing the lawn in a work area. Either a virtual border or, more conventionally, an electromagnetic border wire surrounds and thereby defines the work area of the autonomous lawnmower in a garden environment. The autonomous lawnmower mows, e.g., cuts, plants at a predefined height above ground within the working area, irrespective of the type of plants.

The plants in the working area include desired plants as well as undesired plants. Hereinafter, undesired plants are subsumed under the term “weed”. The autonomous working device 2 is configured to extend the capabilities of known autonomous lawnmowers beyond the mere mowing of the lawn in the work area by also performing weed suppression (weed control).

The weed control system 1 includes not only the autonomous work device 2, but also at least one shading plate 3, which is carried attached to the autonomous working device 2.

The autonomous work device 2 may carry a plurality of shading plates 3 in a magazine on board of the autonomous work device 2.

The autonomous working device 2 comprises a release mechanism 4, which a control circuit 70 of the autonomous working device 2 controls. The control circuit 70 may control the release mechanism 4 either to hold the releasable shading plate 3 in a fixed position attached to the autonomous working device 2 or to release the releasable shading plate 3 at a predefined location relative to the current position of the autonomous working device 2.

In particular, the control circuit of the autonomous work device 2 may control the release mechanism 4 to drop the releasable shading plate 3 that is carried attached to a bottom surface of the chassis (hull) 2.1 of the autonomous working device at the current position of the autonomous working device 2 to the ground.

The chassis 2.1 of the autonomous work device 2 may carry at least one shading plate 3 in a recessed portion of the bottom surface of the chassis 2.1. Thereby, the autonomous work device 2 avoids that the at least one shading plate 3 slips of the release mechanism 4 while the autonomous work device 2 is moving, e.g., due to dead branches lying on the ground in the work area.

The upper portion of FIG. 1 illustrates the autonomous work device 2 performing its main working task, e.g., mowing the lawn in the working area. The autonomous working device 2 holds the releasable shading plate 3 by the release mechanism 4 in the attached position to the autonomous working device 2. The autonomous work device 2 includes a sensor means 5, which may include at least one camera sensor, for detecting weed in the lawn by evaluating sensor signals, e.g., images acquired by the camera sensor.

The images may be analyzed using a machine learning approach that provides a pixel-level segmentation of weed and non-weed areas in the image as illustrated and discussed with reference to FIG. 4.

From a determined position of a detected weed in an image, a 3D position of the weed relative to the autonomous work device 2 can be computed. The computed 3D position relative to the autonomous work device 2 may then be used to determine a sequence of control commands for a controller of the drive means 6 in order to position the autonomous work device 2 above the weed.

Due to the short distance between the autonomous working device 2 and the detected weed at the time of detection, the assumption that the autonomous work device 2 is moving on a flat ground plane will apply.

By simple geometric computations, each pixel in the acquired image can be related to a 3D position relative to the sensor means 5. Knowing the position and orientation of the sensor means 5 with respect to the chassis 2.1 of the autonomous work device 2, 3D-coordinates relative to the sensor means 5 can be transformed to 3D-coordinates relative to the chassis 2.1 of the autonomous working device 2. This enables to compute a trajectory (movement path) for the autonomous work device 2 to move from its current position corresponding to the position of the autonomous work device 2 when capturing the image to the determined position of the detected weed. Based on the computed trajectory, a sequence of control commands in order to position the autonomous work device 2 at a position with the releasable shading plate 3 above the location of the detected weed is determined.

The autonomous working device 2 includes drive means 6, which may comprise a number of wheels or tracks and propulsion means such as at least one electric motor. The autonomous work device 2 moves in the working area driven by the drive means 6 under the control of the control circuit 70.

When the autonomous working device 2 arrives at the position in the working area in which the releasable shading plate 3 in the attached position at the autonomous robot device 2 is assumed to be above the location of the detected weed, the release mechanism 4 releases the releasable shading plate 3 onto the location of the detected weed. The releasable shading plate 3 may be dropped on the location of the detected weed. The dropped shading plate deprives the detected weed from sunlight as long as the releasable shading plate 3 remains in the dropping position above the location of the detected weed.

Afterwards, the autonomous working device 2 may continue with performing its main operational task of mowing and simultaneously searching for further weed in the obtained images included in the sensor signals provided by the sensor means 5. The lower portion of FIG. 1 shows the releasable shading plate 3 having just been released on the location of the detected weed and the autonomous working device 2 continues mowing.

Once the releasable shading plate 3 is released on the location of the weed, they are left resting in the location for a predetermined time, e.g., three weeks, in order to achieve a degradative effect on the weed.

After the predetermined time has elapsed, the releasable shading plate 3 maybe collected by the autonomous work device 2 itself.

The autonomous work device 2 may include the release mechanism 4 configured to recollect the releasable shading plates 3, e.g., using an electromagnet or a suction cup or the release mechanism 4 to grasp the releasable shading plate 3 again in order to move the releasable shading plate 3 into an attached position to the autonomous working device 2.

The release mechanism 4 may include an additional mechanism to lower the electromagnet or the suction cup towards the ground in order to grasp the deposited shading plate 3 using electromagnetism or negative pressure respectively.

Alternatively, the autonomous work device 2 may inform a user via a user interface of those deposited shading plates 3 that need to be collected. The user may then reinsert the releasable shading plate 3 into a drop mechanism of the release mechanism 4. Alternatively, the user may put the recollected releasable shading plate 3 at a storage location, e.g., the storage location arranged at a base station 7 of the autonomous work device 2, from which the autonomous work device 2 may autonomously fetch the releasable shading plate 3.

The autonomous work device 2 might use the sensor means 5, in particular a camera sensor, to localize itself in the working area. The autonomous work device 2 may generate (build) a map of the work area based on the sensor signals acquired by the sensor means 5, e.g., using SLAM or similar techniques.

The autonomous work device 2 may store data on detected weeds and released shading plates 3 associated with the map to keep track of weed growth of the detected weed, corresponding position of the detected weed, and location of released shading plates 3. Additionally, a respective deploy time of the releasable shading plate 3 and/or an elapsed time since releasing the releasable shading plate 3 on the target weed might be stored in association with each detected weed. This enables the control circuit of the autonomous work device 2 to determine the time when to recollect each deposited shading plate 3.

The releasable shading plates 3 may comprise some encoded identification information, e.g., an unambiguous identification code, in order to distinguish between individual shading plates 3. The encoded identification information may include at least one of a machine-readable identification information and an identification information readable by the user.

Machine-readable identification information enables the autonomous work device 2 to identify individual shading plates 3. The autonomous work device 2 may include identification means to identify individual shading plates 3 and distinguish between the releasable shading plates 3 based on the machine-readable identification information of the releasable shading plate 3. The autonomous work device 2 may therefore implement an additional function of controlling the location of the releasable shading plate 3 in the work area at regular time intervals during the predetermined time during which the releasable shading plate 3 is deployed in the working area.

Arranging the unambiguous identification information readable by the human user on each shading plate 3, enables the weed control system to direct the user to that individual shading plate 3, for which the predetermined time has elapsed, and the user is requested to recollect the releasable shading plate 3.

The identification information may be encoded using at least one of RFID codes, QR codes, color codes, symbols, characters or numerals.

The autonomous work device 2 may comprise means (sowing means) to drop some seeds onto an area around the location where a released shading plate 3 had been recollected. The sowing means may include a storage chamber 66 for storing an amount of seeds, in particular grass seeds, and a dispenser mechanism 67 configured to extract a predefined amount of seeds from the seed storage chamber 66. The dispenser mechanism 67 may then distribute the extracted predefined amount of seeds controlled by the control circuit 70 on the location from where the releasable shading plate 3 had been recollected.

For positioning the autonomous work device 2, in particular the dispenser mechanism 67, at the exact location of the presumed blank spot in the work area left by their recollected shading plate 3, a corresponding procedure as for releasing and recollecting the releasable shading plate 3 may be performed. Thus, a potential blank spot without any vegetation on the lawn after recollecting deployed shading plates 3 may be re-cultivated with desired plants.

Additionally, the sowing means for dropping some seeds may include any combination of deployable mechanisms for rolling a re-seeded area using a drum body, for watering the re-seeded area using water from an internal water tank of the autonomous working device 2, and for fertilizing the reseeded area using some fertilizer extracted from an internal fertilizer tank of the autonomous working device 2.

Figure 2:
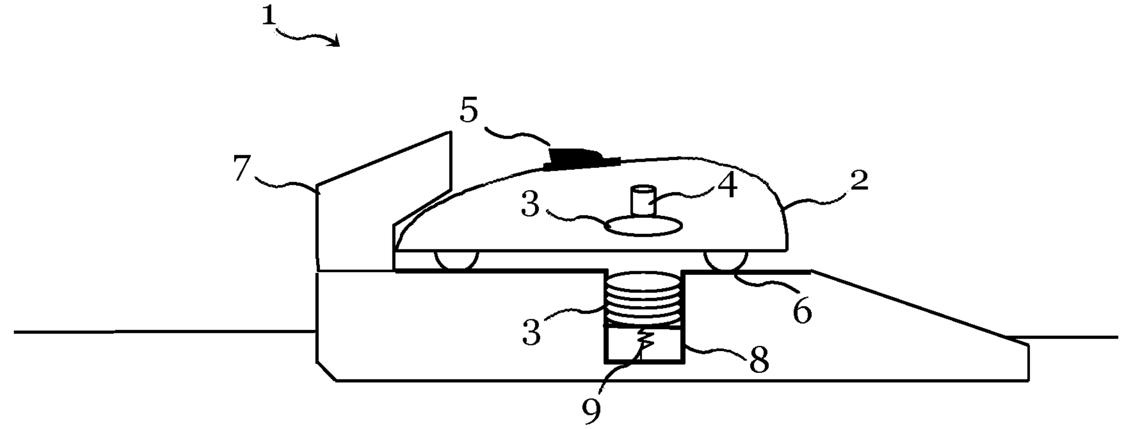
FIG. 2 presents a schematic view of an embodiment of a base station with a storage location for shading plates.

FIG. 2 presents a schematic view of an embodiment of a base station 7 with a storage location 8 for shading plates 3, and the autonomous robot device 2 in a position at the base station 7.

The releasable shading plate 3 may be attached to a bottom surface of the chassis 2.1 of the autonomous work device 2 by the release mechanism 4 including for example, at least one electromagnet and the releasable shading plate 3 being of ferromagnetic material, or the releasable shading plate 3 including at least ferromagnetic elements.

Alternatively, the releasable shading plate 3 can be held in the attached position to the bottom surface of the chassis 2.1 of the autonomous work device 2 by the release mechanism 4 including at least one suction cup controlled by the control circuit 70.

Additionally or alternatively, the autonomous work device 2 may include a chamber (plate magazine) with shading plates 3 stored along each other or stacked above each other.

The plate release mechanism 4 may include a spiral mechanism to deploy single releasable shading plates 3 individually from the plate magazine configured to store a plurality of releasable shading plates 3.

Alternatively or additionally, the base station 7 of the autonomous work device 2 may include a releasable shading plate storage 8 configured to store a plurality of shading plates 3.

Alternatively or additionally, the releasable shading plate storage 8 may be located at another location within the working area of the autonomous working device 2.

The releasable shading plate storage 8 allows to include and to manage a large number of shading plates 3 by the weed control system 1.

The releasable shading plate storage 8 may comprise a stack of shading plates 3 arranged in an open-topped magazine chamber, wherein the stack of shading plates 3 is loaded with a spring 9 such that the releasable shading plate 3 at the top of the stack of shading plates 3 is kept roughly at the top level of the magazine chamber. In order to grasp the topmost shading plate 3 of the stack of shading plates 3, the autonomous working device 2 moves above the open topped magazine chamber of the releasable shading plate storage 8. The autonomous working device 2 may use the grasping function for recollecting shading plates 3 in order to grasp the topmost shading plate 3 from the stack of shading plates 3 arranged in the magazine chamber.

Figure 3:
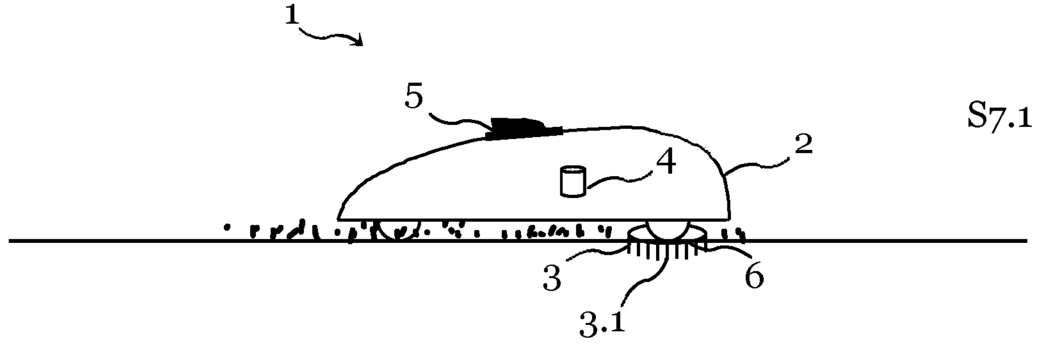
FIG. 3 illustrates the autonomous work device fixing the ground spike of the releasable shading plate in an embodiment.

FIG. 3 illustrates the autonomous work device 2 fixing a ground spike 3.1 of the releasable shading plate 3 in an embodiment.

The releasable shading plate 3 might include at least one, or a plurality of ground spikes 3.1 extending from a bottom surface of the releasable shading plate 3 facing towards the ground. The ground spikes 3.1 may include at least one of soil bolts, soil clamps, ground pegs, and earth nails.

The weed control system 1 may be configured to move the autonomous robot device 2 at least once or even multiple times, preferably multiple times with changing drive directions, over the releasable shading plate 3 including the ground spike(s) 3.1 in order to fixate the releasable shading plate 3 at the location of the target weed in the working area. In particular, the autonomous working device 2 is moved in such a manner over the releasable shading plate 3, that at least one wheel of the moving means 6 exerts pressure towards the ground onto an upper surface of the releasable shading plate 3 that has been dropped onto the location of the weed. Thus, the autonomous work device 2 drives the ground spikes 3.1 into the upper layers of the soil at the location of the weed using the mass of the autonomous working device 2.

The releasable shading plate 3 including the at least one ground spike 3.1 remains at the exact location independent from environmental influences for the entire predetermined time. Such environmental influences attending to reposition the releasable shading plate 3 may include weather phenomena such as wind, rain, or animals roaming around the working area.

The releasable shading plate 3 may comprise a coating of a protective coating material preventing corrosion due to the environmental influences when exposed to the nature in the working area for the predetermined amount of time.

An alternative to the releasable shading plate 3 that is at least partially made of metallic material, the releasable shading plate 3 may include exclusively decomposable material that decompose over time.

Alternatively, variants of the releasable shading plate 3 may include water-dissolvable shading plates 3 or UV-decomposable shading plates 3.

The releasable shading plate 3 being at least one of decomposable over time, water-dissolvable or UV-decomposable may enable a less complex design of the weed control system 1 that does in particular not require implementing any means for recollecting the deployed shading plates 3. Alternatively, a specific user interface for prompting the user to re-collect the deployed shading plates 3 after the predetermined time has elapsed is also not required.

The releasable shading plate 3 is a plate of a generally flat appearance made of a material that is opaque, e.g., inhibit that light passes through the releasable shading plate 3 from the upper surface to the lower surface of the releasable shading plate 3.

The releasable shading plate 3 may have any geometric base surface area, e.g., circular, angular rectangular, square surface area.

The weed control system 1 may be configured to handle shading plates 3 having a same common geometric base surface area.

Alternatively, the weed control system 1 may be configured to handle shading plates 3 having at least two geometric base surface areas for a targeted deployment on weed areas of different sized in the work area.

Figure 4:
FIG. 4 illustrates image processing for an embodiment of the autonomous work device comprising a camera sensor.
Figure 4:
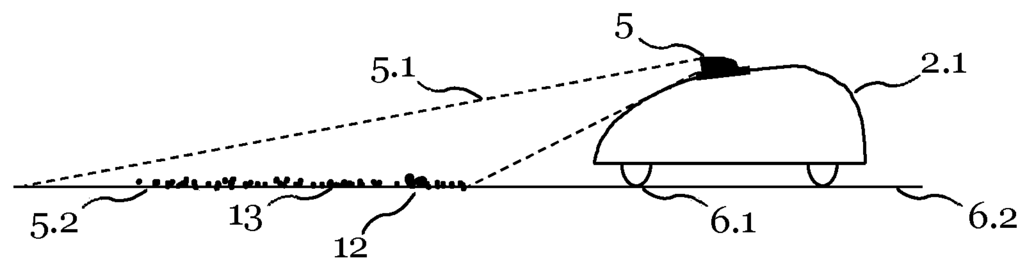
Figure 4:
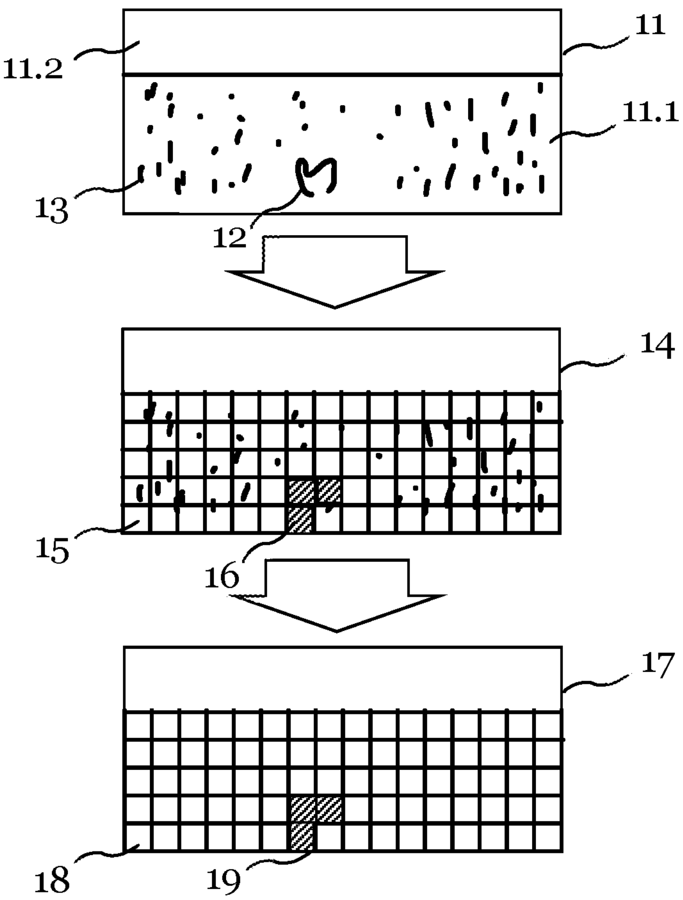

FIG. 4 illustrates an example of image processing for an embodiment of the weed control system 1 including the autonomous work device 2 with the sensor means 5 comprising a camera sensor.

The camera sensor acquires image data using a digital camera mounted on top of the chassis 2.1 of the autonomous work device 2 and provides a sensor signal that, for example, includes a sequence of RGB images in the image signal. The weed control system 1 may process the sensor signal in a control circuit of the autonomous work device 2 locally, or in at least one remote server S that a communication network N links to the autonomous work device 2.

The autonomous work device 2 arranges the camera sensor 5 on an upper position on top of the chassis 2.1 of the autonomous work device 2 facing forward, e.g., with spatial field-of-view 5.1 around a centre viewing axis essentially corresponding with a moving direction of the autonomous work device 2.

The autonomous work device 2 labels individual plants in the obtained RGB images, whether as a weed (unwanted weed) or as a crop plant (desired crop plant, e.g., grass). Identifying a weed species may not be necessary, as there are no weed species-specific measures applied by the weed control system 1.

Known weed detection approaches may include four steps: acquiring images, pre-processing the acquired images, extracting features from the pre-processed images, and subsequently detecting and classifying the plants based on the extracted features.

A machine learning (ML)-based weed classification technique follows a corresponding sequence including acquiring images, pre-processing the acquired images extracting features, or, with feature selection, applying an ML-based classifier, and evaluating the performance.

Pre-processing may include, for example, image enhancement.

Classifying the plants may include discriminating between weed (unwanted weed) and crop plant (desired crop plant, e.g., grass).

Examples for weed detection using deep learning techniques from images may be implemented based on the techniques disclosed in A. S. M Mahmudul Hasan, Ferdous Sohel, Dean Diepeveen, Hamid Laga, and Michael G. k. Jones: "*A survey of deep learning techniques for weed detection from images*", May 2021. In: Computers and Electronics in Agriculture, May 2021.

The camera sensor obtains a sensor signal that comprises a sequence of RGB images. The camera view 11 of FIG. 4 represents one exemplary view from the camera sensor, which is pictured in an image (image frame) of the sequence of images.

The camera view 11 depicts in a lower portion 11.1 a ground area forming part of the working area imaging the ground within the field-of-view 5.1 of the camera sensor. The camera view 11 depicts in an upper portion 11.2 portions within the field-of-view 5.1 of the camera sensor that do not form part of the working area.

The camera sensor captures an image 14 depicting the current camera view 11 or field-of-view 5.1 of the camera sensor.

The camera view 11 depicts a portion of the working area, which includes plants comprising wanted plants, e.g., grass plants 13 in a lawn area and one unwanted plant 12 (weed 12).

The captured image 14 (camera pixel image 14) depicts the region of the working area, which includes the wanted plants, e.g., grass plants 13 in the lawn area and the unwanted plant 12 (weed 12) within the camera view 11.

The weed control system 1 performs an image analysis of the captured image 14 that includes image pixels 15, which only include pixel data of grass plants 13, and image pixels 16, which include at least partially pixel data depicting at least portions of the weed 12.

The image analysis may include applying a ML-process on the camera pixel image 14.

The image analysis of the camera pixel image 14 may include a segmentation of weed areas and non-weed areas in the camera pixel image 14 on level of individual image pixels. The image analysis provides a segmented image 17 that classifies each pixel belonging to the working area included in the image 17 as a pixel classified either as a pixel 19 of a weed area or as a pixel 18 that is classified as a non-weed area.

Thus, the image analysis performs detection of weed 12 in the field-of-view 5.1 of the camera sensor.

The segmented image 17 including the position of the weed 12 in a 2D-image provides the base geometry for subsequently computing a 3D-position of the weed 12 relative to the camera sensor.

Figure 5:
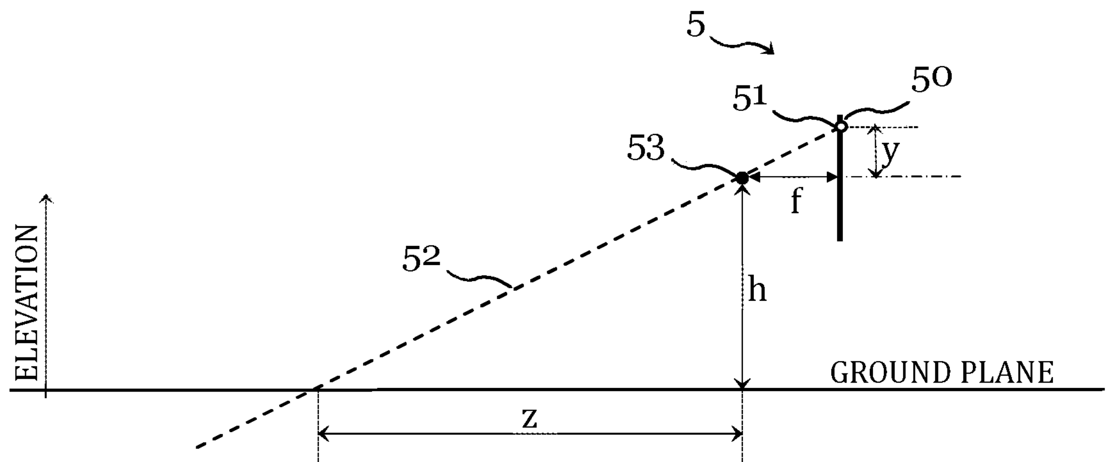
FIG. 5 illustrates a specific aspect of the image processing in an embodiment of the autonomous work device of FIG. 4.

FIG. 5 illustrates a specific aspect of the image processing in an embodiment of the weed control system 1 including the autonomous work device 2 of FIG. 4. In particular, FIG. 5 illustrates computing the 3D-position of the detected weed 12 relative to the camera sensor included in the sensor means 5 based on the segmented image 17 including a 2D image position of the weed using basic geometrical considerations.

FIG. 5 depicts the camera sensor, e.g., a camera chip, including the camera image plane 50 arranged at a vertical height h above the ground plane.

The ground plane is assumed to be a flat plane, which will provide sufficiently precise results for small horizontal distances in typical gardening applications.

The ray-of-light 52 for one pixel 51 of the image plane 50 and a focal point 53 of the camera sensor is shown in FIG. 5. The geometry of the arrangement of FIG. 5 results in equation (1)

$$\frac{z}{h} = \frac{y}{f}; \tag{1}$$

The horizontal distance z on the ground plane of the pixel 51 may be computed from rewriting equation (1) as $$z = \frac{y}{f}h; \tag{2}$$

with a focal length f of the camera sensor, the vertical height of the focal point 53 in vertical elevation above the ground plane, and a vertical distance y of the pixel 51 from the center axis of the image plane 50.

By evaluating equation (2) for each pixel 51 classified in the segmented image 17 as a pixel 19 of a weed area, a relative distance z for the respective detected weed 12 from the focal point 53 and from the camera plane 50 may be computed.

The camera sensor is arranged at position on the autonomous work device 2 a priori known.

Thus, FIG. 5 illustrates the basic principle of the process of computing a relative 3D position of the detected weed 12 with regard to the position of the autonomous working device 2 at the time of capturing the image based on the computed 2D image position of the detected weed 12 in the segmented image 17.

The computed relative 3D position of the detected weed 12 may be used subsequently to compute a trajectory for the autonomous work device 2 from its current position in the work area to the computed location of the detected weed 12. In particular, the trajectory for the autonomous work device 2 ends at a suitable position from where to release the releasable shading plate 3 onto the location of the detected weed 12.

Figure 6:
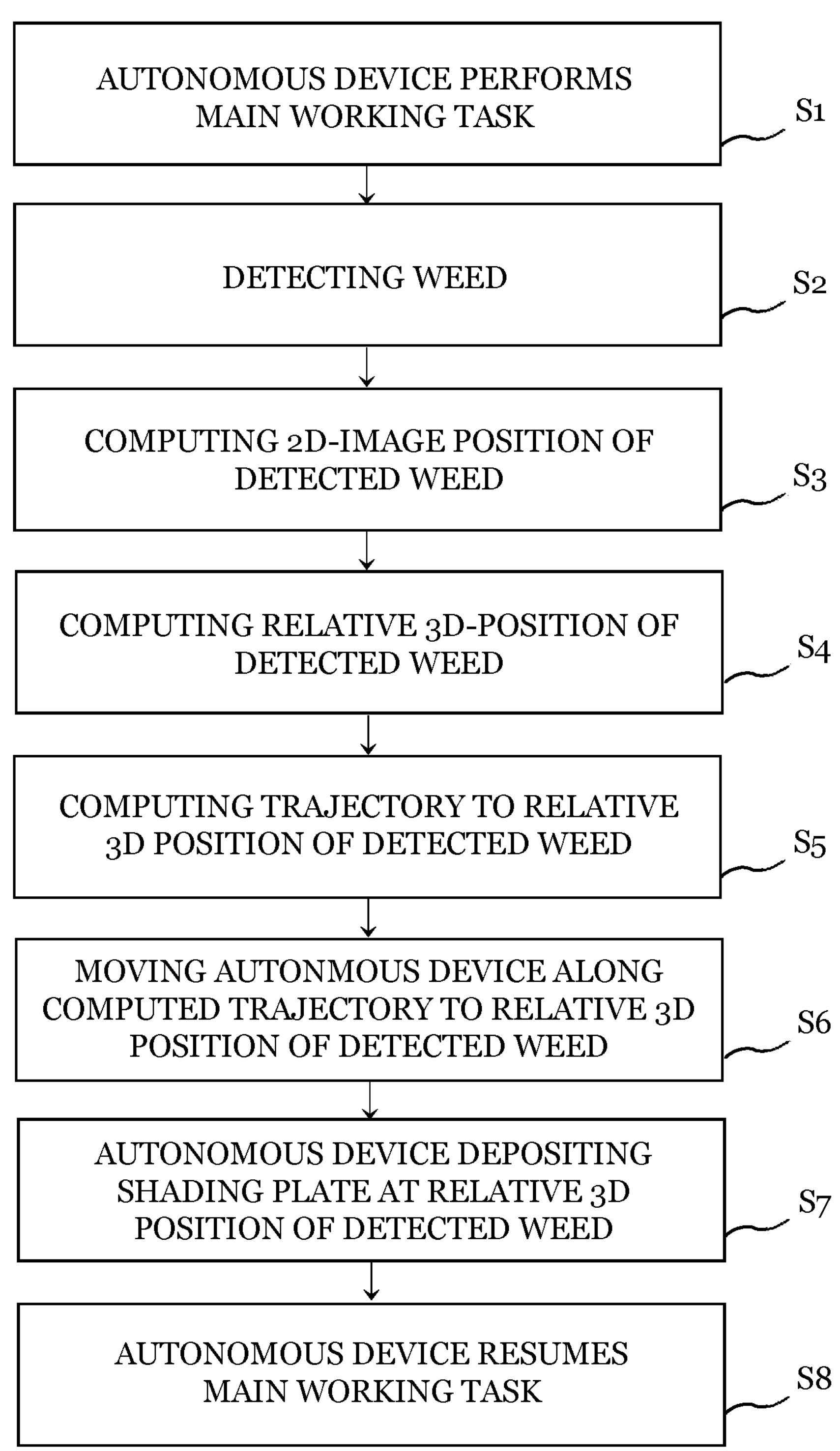
FIG. 6 provides a simplified flowchart of a process of operating the weed control system.

FIG. 6 provides a simplified flowchart of a process of operating the weed control system 1.

In step S1, the autonomous work device 2 performs the main working task in the work environment. In particular, the autonomous work device 2 mows grass on a lawn.

In step S2, the autonomous work device 2 detects weed 12 in the work environment. The detected weed 12 represents a target plant, which is to be suppressed in the working environment.

In step S3, the autonomous work device 2 computes the 2D image position of the detected weed 12.

In step S4, the autonomous work device 2 computes a relative 3D position of the detected weed 12 based on the computed 2D image position of the detected weed 12.

In step S5, the autonomous work device 2 computes a trajectory from its current position to the computed relative 3D position of the detected weed 12.

In step S6, the autonomous work device 2 moves along the computed trajectory to the relative 3D position of the detected weed 12.

In step S7, the autonomous work device releases the releasable shading plate 3 at the computed relative 3D position of the detected weed 12.

Step s7 may include a sub-step S7.1, in which the autonomous work device 2 fixates the releasable shading plate 3 at the location of the detected weed.

In step S8, the autonomous work device resumes performing its main working task in the work environment.

Figure 7:
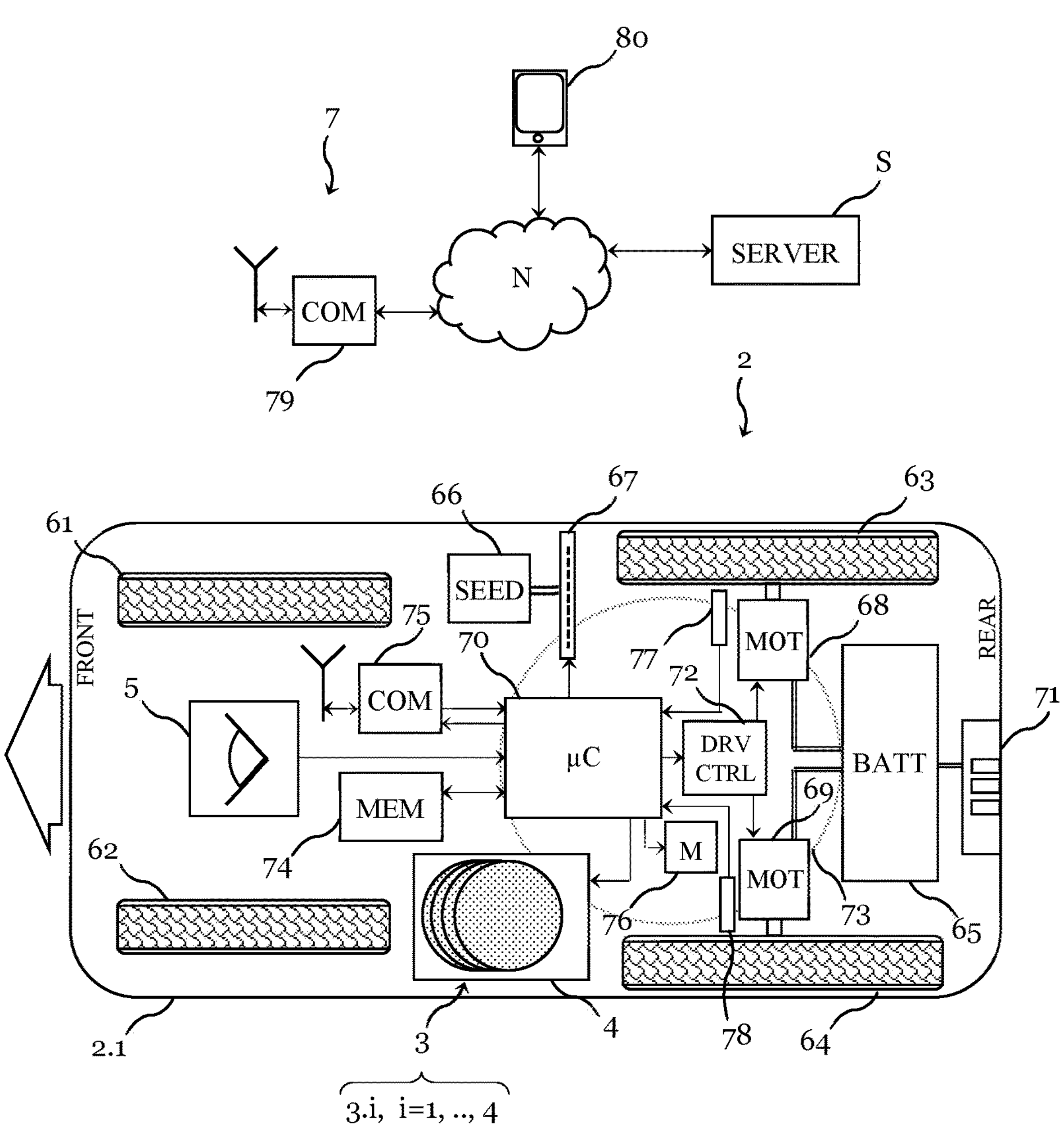
FIG. 7 provides a simplified block diagram of an autonomous work device of the weed control system.

FIG. 7 provides a simplified block diagram of an autonomous work device 2 of the weed control system 1 and some of its structural building blocks.

The autonomous work device 2 comprises a pair of rear wheels 63, 64, which are driven by respective electric motors 68, 69.

The autonomous work device 2 of FIG. 7 comprises front wheels 61, 62, which are not driven but may freely follow a movement of the autonomous work device 2 in response to a relative rotation of the rear wheels 63, 64. Thus, the direction of the autonomous work device 2 is controlled by controlling the rotational speed of the rear wheels 63, 64 relative to each other.

The electric motors 68, 69 are controlled by a drive controller 72 and supplied with electric energy drawn from a rechargeable battery 65. The rechargeable battery 65 may be recharged via a charging interface 71, which a charging unit of the base station 7 automatically connects with a charger when the autonomous work device 2 arrives at the base station 7. The controller 72 is furthermore connected to a control circuit 70, which is configured to perform the method steps necessary for generating a representation of the working area, for navigating the autonomous work device 2 in the working area based on a generated representation of the working area and based on sensor signals provided by the sensor 5.

The representation of the working area may include a map of the working area in a machine-readable format, which the control circuit may read and interpret. The representation of the working area may be stored in a memory 74 connected to integrated in the control circuit 70.

The control circuit 70 is connected to movement sensors 77, 78 and a memory 74. FIG. 7 depicts the movement sensors 77 and 78 as wheel rate sensors, which preferably detect the wheel rates of the rear wheels 63, 64.

Alternatively, wheel rate sensors might be arranged at the front wheels 63, 64 requiring respectively adapted differential drive equations. Wheel rate sensors at the front wheels 61, 62 could reduce sensor errors due to wheel slip.

The sensor 5 of the autonomous lawn mower may include a sensor suite comprising a plurality of sensors for sensing the environment of the autonomous work device 2, in addition to the movement sensors 77, 78 already mentioned.

The sensor 5 may include at least one of an inertial measurement unit (IMU), a g-sensor, visual sensors LIDAR- or RADAR-sensors, a global navigation satellite system (GNSS) sensor each.

The sensor 5 also may include a camera sensor. The camera sensor is arranged to acquire images from a field-of-view 5.1 essentially towards the front of the autonomous work device 2 in a main moving direction of the autonomous working device 2. The camera sensor 5 is often arranged in an elevated position providing a field-of-view 5.1 towards the front of the chassis 71 of the autonomous work device 2.

When the autonomous work device 2 is moving around the work area, the control circuit 70 obtains sensor signals including measured values and sensor data provided by at least a subset of the sensors 5 arranged in the autonomous work device 2 and stores the sensor data including the measured values in the memory 74. Based on the acquired sensor data, the control circuit 70 computes a trajectory for the autonomous work device 2 in order to perform its work task, and position and orientation of the autonomous work device 2 along the trajectory can be corrected to arrive at a target location starting from the current position and moving along the computed trajectory.

The autonomous work device 2 may perform a main working task as an autonomous lawn mower. The autonomous work device 2 of FIG. 7 comprises a mowing assembly 73 operated by a mower drive 76, that, e.g., includes an electric motor for driving blades or cutters of the mowing assembly 73, controlled by mow control signals generated and output by the control circuit 70.

The autonomous work device 2 may include a communication unit 75 configured to provide a wireless communication capability for the autonomous work device 2. The communication unit 75 may include at least one wireless transceiver connected with at least one antenna arranged on or integrated with the chassis 2.1 of the autonomous work device 2.

The control circuit 70 may perform a bi-directional communication via the communication unit 75 with an external server S. In particular, the control circuit 70 may perform the bi-directional communication via the communication unit 75, via a communication gateway 79 of the base station 7 to an external network N and further to the external server S, or even plural external servers S.

The bidirectional communication may include a wireless communication based on at least one of a cellular wireless network protocol, a wireless personal area network (WPAN) protocol and wireless local area network (WLAN) protocol.

The external network N may include at least one of a local area network (LAN), a wireless local area network (WLAN), a wide area network (WAN), and an internet-protocol (IP)-based network.

The autonomous work device 2 includes the release means 4, in particular a plate release means 4 (plate disposal means, plate dropping means).

The plate release means 4 is illustrated in FIG. 7 indicating a shading plate magazine storing four shading plates 3.*i*, *i*=1, . . . , 4. The plate release means 4 is configured to release a shading plate 3 of the plural shading plates 3.*i* stored in the releasable shading plate magazine when receiving a release signal generated and output by the control circuit 70.

The control circuit 70 may obtain a plate stock indication signal from the plate release means 4 indicating how many shading plates 3.*i* are currently stored in the releasable shading plate magazine.

The plate release means 4 may implement a capability to automatically refill the releasable shading plate magazine, e.g., at the base station 7 from a plate storage location arranged at the base station 7.

The autonomous work device 2 may include a dispenser mechanism 67 configured to drop a predefined amount of seed in response to a seed control signal generated and output by the control circuit 70. The dispenser mechanism 67 may be connected with the seed storage chamber 66 storing a certain amount of seed, e.g., grass seed.

Extending beyond the autonomous work device 2 shown in FIG. 7, the autonomous work device 2 may also include a watering means with small water tank for watering an area, on which seed has been distributed. The control circuit 70 may implement a function of watering the area on which the seed has been distributed before using a water dispenser of the autonomous work device 2 by computing a respective movement trajectory for the autonomous work device 2 for watering the area. The control circuit 70 then controls the drive controller 72 to control movement of the autonomous work device along the computed trajectory and simultaneously controlling the water dispenser fed from the water tank.

Alternatively or additionally, the control circuit 70 may implement a function of rolling an area on which seed has been distributed using one wheel of the wheels 61, 62, 63, 64 of the autonomous work device 2 by computing a respective trajectory for rolling the area and moving along the computed trajectory for rolling.

The control circuit 70 may include at least one integrated circuit (IC), application specific integrated circuit (ASIC), microcontroller, microprocessor, signal processor.

The control circuit 70 may be configured to communicate via the communication unit 75 with at least the server S for performing some processing steps using on cloud computing.

It is to be noted that the above given explanations of the preferred embodiments use a calculation of the location of the identified target plants 12 based on a signal from the camera sensor of the sensor means 5 in order to obtain information on the locations of identified target plants 12. However, it is also possible to determine locations of identified target plants 12 and provide information on these locations to the control circuit using an external device such as a user terminal. Such a user terminal may be a smartphone 80, on which an application is executed that allows to identify a current position of the smart phone with high precision. Thus, a user could hold the smart phone 80 above a plant, which the user identifies as target plant 12, and trigger determination of the plant location manually. When the user holds his smartphone close to the plant, the location of the smartphone coincides with the location of the plant.

The application could also be programmed to automatically identify target plants 12 and determine their locations. In that case, the user only needs to walk in the working area holding the camera of the smartphone 80 directed to the ground and activate the application. In that case, it would be necessary that the application enables the smartphone 80 to automatically identify target plants 12 and determine the plants' 12 position using for example its built in GPS system. This information on the location of target plants 12 can then be transmitted to the working device 2 using the communication unit 75. Thus, the working device 2 will obtain information on the location of the target plant(s) 12 and, based on knowledge of its own position, it is possible to drive to the location of the target plant and release a shading plate 3 at the location.

Transmitting information on the location of target plants 12 may be performed instead of calculating such locations based on information on the environment obtained by the camera sensor, or as a supplemental location information. It is also possible that such information on location of plants 12 is collected upfront and stored in the server S and then, when the working device 2 starts its operation, the collected information on locations is transmitted to the working device 2.

What is claimed is:

1. A weed control system, comprising:

an autonomous work device, including: driving means configured to move the autonomous work device in an environment and a control circuit configured to control the driving means to navigate the autonomous work device in the environment; and at least one releasable shading plate arranged attached to a release mechanism of the autonomous work device, wherein the control circuit is configured to obtain information on a location of an identified target plant, and to control the release mechanism to release and drop the releasable shading plate onto the location of the identified target plant to remain on the location of the identified target plant for blocking light from passing to the detected target plant.

2. The weed control system according to claim 1, the weed control system further comprising:

sensor means configured to sense the environment and to generate a sensor signal based on the sensed environment of the autonomous work device, wherein the control circuit is further configured to detect a plant in the environment based on the sensor signal, to determine whether the detected plant is the identified target plant, to compute the location of the identified target plant.

3. The weed control system according to claim 2, wherein the sensor means comprises a camera sensor, and the control circuit is configured to detect the plant by performing image processing of the sensor signal, and determine the identified target plant using a classification algorithm or a deep neural network.

4. The weed control system according to claim 1, wherein the weed control system comprises a user input terminal communicatively coupled to the autonomous work device, and the user input terminal is configured to transmit at least information on the location of the identified target plant.

5. The weed control system according to claim 1, wherein the control circuit is configured to perform a mapping function, and to record at least one of the location of the identified target plant and a location of the releasable shading plate in a map.

6. The weed control system according to claim 1, wherein the release mechanism comprises at least one electromagnet, and the releasable shading plate includes a metallic element, and the control circuit is configured to control releasing the releasable shading plate by controlling the at least one electromagnet.

7. The weed control system according to claim 1, wherein the releasable shading plate is made of metallic material and is covered with a corrosion-protective coating.

8. The weed control system according to claim 1, wherein the releasable shading plate is made of decomposable material and contains grass seeds and/or fertilizer.

9. The weed control system according to claim 1, wherein the releasable shading plate comprises at least one ground spike, and the control circuit is configured to control the driving means to move the autonomous work device onto the releasable shading plate.

10. The weed control system according to claim 1, wherein the release mechanism comprises at least one suction cap, and the control circuit is configured to control releasing the releasable shading plate by controlling the at least one suction cap.

11. The weed control system according to claim 1, wherein the releasable shading plate comprises at least one ground spike, and the control circuit is configured to navigate the autonomous work device to drive onto the releasable shading plate after release.

12. The weed control system according to claim 1, wherein the releasable shading plate comprises at least one of a RFID tag, a QR code and a color coding encoding an unambiguous identity code of the releasable shading plate.

13. The weed control system according to claim 1, wherein the weed control system is configured to release the releasable shading plate at a storage location.

14. The weed control system according to claim 13, wherein the storage location is a charging station of the autonomous work device.

15. The weed control system according to claim 1, wherein the weed control system is configured to recollect the releasable shading plate after a predetermined time has elapsed since releasing the releasable shading plate.

16. The weed control system according to claim 1, wherein the weed control system comprises a user interface configured to inform a user when to recollect the releasable shading plate.

17. The weed control system according to claim 1, wherein the weed control system comprises a sowing means, and the control circuit is configured to control the sowing means to sow seeds, at the location of the identified target plant after recollecting the releasable shading plate or after the releasable shading plate has decomposed.

18. The weed control system according to claim 17, wherein the sow seeds are grass seeds.

19. The weed control system according to claim 1, wherein the autonomous work device is an autonomous lawn mower.

20. A weed control system, comprising:

an autonomous work device, including: driving means configured to move the autonomous work device in an environment and a control circuit configured to control the driving means to navigate the autonomous work device in the environment; and at least one releasable shading plate arranged attached to a release mechanism of the autonomous work device, wherein the control circuit is configured to obtain information on a location of an identified target plant, and to control the release mechanism to release the releasable shading plate onto the location of the identified target plant; and the control circuit is configured to perform a mapping function, and to record at least one of the location of the identified target plant and a location of the releasable shading plate in a map.

21. A weed control system, comprising:

an autonomous work device, including: driving means configured to move the autonomous work device in an environment and a control circuit configured to control the driving means to navigate the autonomous work device in the environment; and at least one releasable shading plate arranged attached to a release mechanism of the autonomous work device, wherein the releasable shading plate comprises at least one ground spike;

wherein the control circuit is configured to obtain information on a location of an identified target plant, and to control the release mechanism to release the releasable shading plate onto the location of the identified target plant, and the control circuit is configured to control the driving means to move the autonomous work device onto the releasable shading plate after releasing the releasable shading plant.

* * * * *